United States Patent Office 3,562,829
Patented Feb. 16, 1971

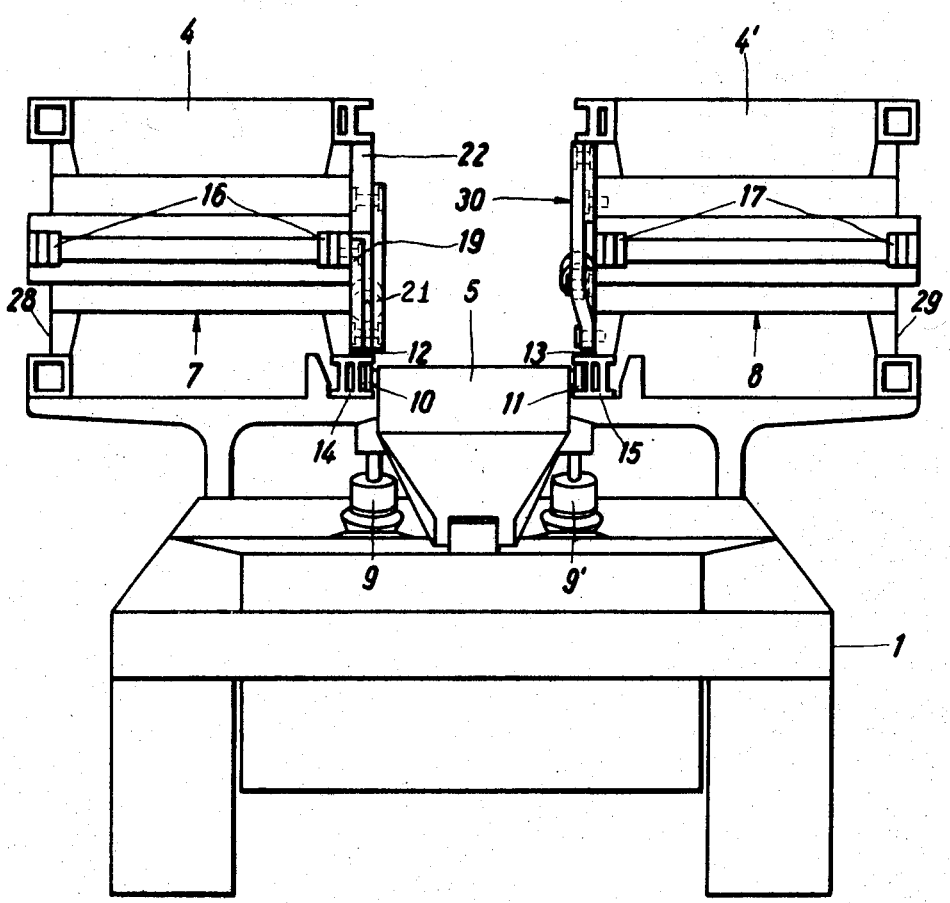

3,562,829
AUTOMOTIVE VEHICLE ADAPTED FOR TRANSPORTING AND INSTALLING A FOLDING BRIDGE
Friedhelm Söffge, Kornwestheim, Germany, assignor to Firma Dr.-Ing h.c.F. Porsche KG, Stuttgart-Zuffenhausen, Germany
Filed Feb. 25, 1969, Ser. No. 802,105
Claims priority, application Germany, Mar. 1, 1968,
P 16 80 207.6
Int. Cl. E01d *1/00*
U.S. Cl. 14—1                                                   11 Claims

ABSTRACT OF THE DISCLOSURE

A powered vehicle including apparatus for transporting and installing a prefabricated folding bridge structure having a central bridge portion and folding access ramps, therein the bridge is supported on the vehicle upon a cantilever support pivotally mounted thereon. The control system for effecting pivoting of the access ramps from the folded position into the extended position includes a servo-mechanism of variable length pivotally connected to the central bridge portion and operatively connected with an access ramp through a linkage including at least one rotatable intermediate guide member.

BACKGROUND OF THE INVENTION

Powered vehicles have been provided, in the past, with apparatus for transporting and installing folding bridge structures. Such bridges generally consist of two pivotally-connected halves transported in a folded position and unfolded and secured in an extended position during installation. Constructions of this type, however, involve considerable problems in that the component parts of the bridge structure, which must be operated by the power mechanism of the vehicle, are particularly large and heavy, each component part representing one-half of the bridge. Accordingly, extremely massive actuation forces are required for supporting and installing the folded bridge, thus involving extremely high manufacturing costs incurred in the production of the massive and powerful vehicle required.

Prior attempts to design folding bridge structures which could be supported and installed with actuating forces of lesser magnitude have been made. For example, as disclosed in the applicant's copending application Ser. No. 713,433, filed on Mar. 15, 1968, now U.S. Pat. No. 3,486,180, a bridge structure having folding access ramps can be controlled by means of a system including a hydraulic working cylinder with a piston rod guided within a straight line and engaging a pivotable guide lever. While this structure does indeed result in a substantial reduction in the magnitude of the actuating forces required for installation of the bridge, the particular arrangement of the control system is such that the component parts thereof must be closely controlled with respect to manufacturing tolerances. Thus, the production of this apparatus is exceedingly time-consuming and expensive. The excessive costs are attributable, to a great extent, to the slight manufacturing tolerances involved in the manufacture of the straight-line guidance members employed.

Accordingly, it is an object of the present invention to provide a prefabricated folding bridge of a relatively simple construction capable of being transported and installed by means of a powered vehicle, which requires actuating forces of relatively small magnitude for accomplishing installation of the bridge.

Further, it is an object of the present invention to provide a folding bridge structure, support means for mounting the bridge structure upon a powered vehicle and control means for effecting extension of the bridge structure and installation thereof, wherein the component parts can be manufactured simply by means of a welding construction, thus resulting in a relatively low manufacturing cost.

SUMMARY OF THE INVENTION

The foregoing objects are accomplished, in accordance with the present invention, by a construction of the control system including a servo-mechanism, variable in length and pivotally connected to the central bridge portion and one of the access ramps by means of a guide linkage including at least one rotatable intermediate guide member. Thus constructed, the guide linkage for effecting control of the hinged bridge sections greatly facilitates the manufacture of the control system, e.g., expanding the permissible manufacturing tolerances for points of hinged connection between component parts. Nevertheless, the construction of the control system in accordance with the present invention still maintains the advantage of requiring relatively small actuating forces.

If the servo-mechanism employed is so arranged as to engage the intermediate guide member of the linkage associated with the central bridge portion, an extremely simple connection and support for the individual power transmitting elements is realized. A particularly advantageous construction is obtained when the servo-mechanism directly engages the connecting link of the guide members forming the linkage. In this manner, a simple intermediate guide member is provided, which, together with the adjoining parts of the linkage, can be simply and inexpensively replaced in the event that they are damaged in use. A further advantage of the guide linkage construction in accordance with the present invention resides in a substantially V-shaped configuration of the intermediate guide member associated with the central bridge portion; the point of intersection of the V-shape defines the point of connection of the intermediate guide member with the central bridge portion and the servo-mechanism or other guide member associated with the folding access ramp engages the free end of one of the arms of the V-shape. In this manner, the horizontal rotational motion of the servo-mechanism is reduced, thus creating a simple bearing member at the central bridge portion.

The bridge contemplated by the present invention is preferably of a double-traffic lane type with an intermediate space formed between the two parallel traffic lanes. Preferably, the control system can be arranged at the longitudinal inside or the longitudinal outside of the traffic lanes of the bridge, thus enabling the positioning of the control system to optimize spatial conditions of the vehicle.

BRIEF DESCRIPTION OF THE DRAWINGS

The foregoing objects, features and advantages of the present invention will become more apparent from a consideration of the detailed description hereinbelow, in conjunction with the accompanying drawings illustrating two embodiments of the present invention, wherein:

FIG. 2 represents a front view of the caterpillar-type vehicle on an enlarged scale, wherein the left-hand portion includes the one-armed intermediate guide member corresponding to the left-hand portion in FIG. 1 and the right-hand portion including the V-shaped intermediate guide member corresponding to the right-hand portion on FIG. 1.

DETAILED DESCRIPTION OF THE DRAWINGS

Figure 1:
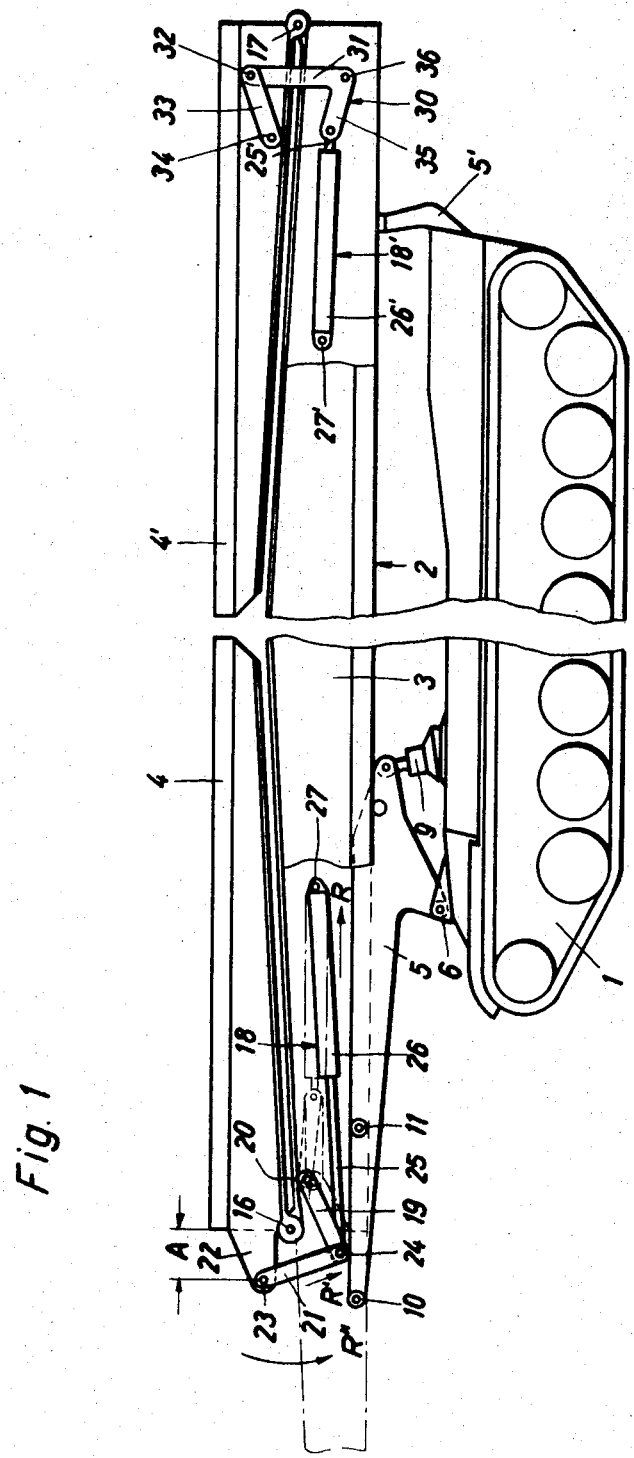
FIG. 1 represents a lateral view of a caterpillar-type vehicle with a folding bridge supported thereon, the left-hand portion of the bridge structure including a control system incorporating a one-armed intermediate guide member and the right-hand portion of the bridge structure including a control system incorporating a V-shaped intermediate guide member.

A double-traffic lane bridge 2 is supported upon a caterpillar-type vehicle 1. The bridge 2 includes a basic structure consisting of a central portion 3 and two access ramps 4 and 4', respectively, hingedly connected to the central portion 3. In the transporting position, as illustrated, the bridge 2 is supported upon a cantilever 5 and a bracket 5'. Cantilever 5 is connected to the vehicle 1 so as to be pivotable about an axis of rotation 6. Cantilever 5 extends between the two inter-connected traffic lanes 7 and 8 of the bridge 2.

Hydraulic jacks 9 and 9' are provided for actuating the cantilever 5. Cantilever 5 further includes guide rollers 10 and movable support rollers 11, disposed for movement within U-shaped guide rails 14 and 15 provided on the longitudinal inner sides 12 and 13 of the traffic lanes 7 and 8, respectively, guide rollers 10 and support rollers 11 serving to effect advancement of the bridge 2 during the installation process.

It should be apparent that the connection and operation of access ramps 4 and 4' are similar; therefore, in the following description, only a single one of the two access ramps is treated in detail with respect to each embodiment. It is to be understood, however, that the details of the particular control system would normally be identical for each of the access ramps.

The access ramp 4, at the end thereof adjacent central bridge portion 3, is connected therewith by means of hinges 16. A control system 18 is provided for pivoting access ramp 4 up about the hinges 16. Control system 18 includes a guide linkage having a one-armed intermediate guide member 19; one end of guide member 19 is pivotally supported at the central portion 3 of bridge 2 by means of bearing pin 20, the other end of guide member 19 being connected with a guide arm 21. Guide arm 21 is pivotally connected, by means of bearing pin 23, with a cross member 22, which is secured to access ramp 4.

A piston rod 25 movably supported within a hydraulic working cylinder 26 is connected at the point of connection 24 of intermediate guide member 19 and guide arm 21. The piston to which piston rod 25 is connected is disposed within cylinder 26 such that oil pressure, supplied from a central hydraulic source (not shown), may act on both sides of the piston. The working cylinder 26 extends in a generally horizontal direction toward the center of the vehicle and is pivotally connected, at the end thereof facing away from intermediate guide member 19, with the central portion 3 of bridge 2 by means of a pivot 27.

The control system 18 is arranged on the inner longitudinal side 12 of the traffic lane 7. Alternatively, if spatial conditions of the vehicle permit, control system 18 could also be attached on the outer longitudinal side 28 of traffic lane 7.

Access ramp 4 can be unfolded by selectively applying oil under pressure into working cylinder 26 so that piston rod 25 is moved in the direction of arrow R. The force exerted on piston rod 25 and transmitted through intermediate guide member 19 and guide arm 21 and finally exerted on access ramp 4 in the direction of arrow R', causes access ramp 4 to be pivoted, by means of the lever arm formed by the distance A of the hinges 16, in the direction R'' into the extended position, as illustrated in dashed lines in FIG. 1. In this position, the bridge 2 can be axially displaced upon rollers 10 and 11 of the cantilever 5, eventually being disposed, in an extended position, in front of the vehicle. Retraction of the bridge 2 and the folding of the access ramp 4 into a transporting position may be effected by merely reversing the order, analogously, of the aforementioned steps.

According to the embodiment illustrated on the right-hand portion of FIG. 1, a control system 18' is provided, which differs primarily from the first-described embodiment in that a substantially V-shaped intermediate guide member 30 is included in the guide linkage. In this embodiment, the parts analogous to the first-described embodiment are referenced with reference numerals to correspond with the first-described embodiment and followed with a prime indicator. Access ramp 4', at the end thereof facing central bridge portion 3, is pivotally connected therewith by means of hinges 17. A control system 18', including a substantially V-shaped intermediate guide member 30, is provided to effect unfolding of access ramp 4' about hinges 17. Intermediate guide member 30 includes a relatively long arm 31, connected with a guide arm 33 by means of a bearing pin 32. Guide arm 33 is pivotally connected to access ramp 4' by means of a bearing pin 34. Additionally, intermediate guide member 30 includes a relatively short arm 35, pivotally connected with piston rod 25' movably supported within a hydraulic working cylinder 26'. Hydraulic working cylinder 26' is disposed, depending upon the spatial conditions of the vehicle 1, either on the inner longitudinal side 13 or on the outer longitudinal side 29 of the traffic lane 8. Working cylinder 26' at the end thereof facing away from intermediate guide member 30, is pivotally connected, by means of pivot 27', with central bridge portion 3 for rotation relative thereto. At the point of intersection of arms 31 and 35, intermediate guide member 30 is pivotally supported, by means of bearing 36, upon central bridge portion 3.

By virtue of this last-described arrangement, it can be seen that no supporting cross member is required at access ramp 4' for effecting unfolding thereof. Further, the piston rod 25' within hydraulic working cylinder 26' is in a retracted position within a working cylinder 26' when the bridge is folded, thus substantially preventing damage to the piston rod during transport of the bridge 2. The folding and unfolding of access ramp 4' is otherwise carried out in a manner similar to that of the first-described embodiment.

Although the present invention has been described with specific reference to two illustrated embodiments, it is to be understood that the scope of the invention is not limited to the details thereof, but is susceptible of numerous changes and modifications as would be obivous to one with normal skill in the pertinent technology. Thus, it is possible to substitute other operating means for effecting the pivoting of the access ramps, i.e., mechanical drives, actuated either manually or electrically, or an engine-driven power take-off unit could be utilized in place of the hydraulic working cylinders illustrated.

What is claimed is:
1. A powered vehicle adapted for transporting and installing a prefabricated folding bridge structure, comprising:
   a prefabricated folding bridge having a central bridge portion and access ramps pivotally mounted thereto at each end thereof for movement between and extended, aligned position and a folded storage and transport position,
   a powered vehicle body,
   a cantilever support pivotally mounted upon said vehicle body, said cantilever support and said bridge having cooperating support track and support roller means supporting said bridge on said cantilever support for movement in the longitudinal direction of said bridge,
   and control means for effecting pivoting of said access ramps from one of said positions to the other of said positions, said control means including variable length servo-devices pivotally secured to said central bridge portion for cooperation with a respective one of said access ramps and a linkage operatively associated with each of said access ramps and the corresponding servo-device, said linkage including at least one rotatable intermediate guide member pivotally secured, at one end thereof, to said central bridge portion and pivotally secured, at the other end thereof, to the free end of said corresponding servo-device, said servo-devices pivoting about the pivotal connection thereof with said central bridge portion, during actuation thereof, to effect pivotal movement of said access ramp.

2. A vehicle according to claim 1, wherein said bridge, when said access ramps are in said extended position, has two parallel lane portions with a central intermediate space, said support tracks being disposed on respective ones of said lanes.

3. A vehicle according to claim 1, wherein said servo-devices include hydraulically-operated piston and cylinder means, and further comprising a hydraulic system in fluid communication with each of said piston and cylinder means.

4. A vehicle according to claim 1, further comprising spaced, ground-engaging power tracks.

5. A vehicle according to claim 1, wherein said linkage further includes guide arm means pivotally secured, at one end thereof, to the respective access ramp and, at the other end thereof, to said intermediate guide member.

6. A vehicle according to claim 5, wherein a respective one of each of said guide arm means, said intermediate guide members and said servo-devices are pivotally interconnected about common bearing pins.

7. A vehicle according to claim 6, wherein the pivotal interconnection of said guide arm means to said access ramp is located at the side of pivotal mounting between a respective one of said access ramps and said central bridge portion that is remote from said central bridge portion, and the pivotal interconnection of said intermediate guide member to said central bridge portion is located at the side of pivotal mounting between a respective one of said access ramps and said central bridge portion that is in proximity to said central bridge portion.

8. A vehicle according to claim 1, wherein said intermediate guide member is constructed in the form of a substantially V-shaped member, having two arms, the point of intersection of said two arms being pivotally secured to said central bridge portion.

9. A vehicle according to claim 8, wherein the free end of one of said two arms of a respective intermediate guide member is pivotally connected with the free end of a respective servo-device.

10. A vehicle according to claim 9, wherein said linkage further includes guide arms each of which is pivotally secured, at one end thereof, to the free end of the other of said two arms of a respective intermediate guide member and, at the other end thereof, to a respective access ramp.

11. A vehicle according to claim 2, wherein said means for effecting pivoting of said access ramps are provided on a lateral surface of a lane portion of said bridge.

References Cited

UNITED STATES PATENTS 3,486,180   12/1969   Soffge _____ 14—1

JACOB L. NACKENOFF, Primary Examiner